United States Patent
Drive et al.

(10) Patent No.: US 8,633,984 B2
(45) Date of Patent: Jan. 21, 2014

(54) PROCESS OF SEQUENTIALLY DUBBING A CAMERA FOR INVESTIGATION AND REVIEW

(75) Inventors: Marine Drive, Bangalore (IN); Andrew Jackson, Las Vegas, NV (US); Vijay Dhamija, Bangalore (IN)

(73) Assignee: Honeywell International, Inc., Morristown, NJ (US)

( * ) Notice: Subject to any disclaimer, the term of this patent is extended or adjusted under 35 U.S.C. 154(b) by 914 days.

(21) Appl. No.: 12/338,389

(22) Filed: Dec. 18, 2008

(65) Prior Publication Data

US 2010/0157050 A1 Jun. 24, 2010

(51) Int. Cl.
*H04N 7/18* (2006.01)
(52) U.S. Cl.
USPC ............................. 348/143; 348/148; 348/500
(58) Field of Classification Search
USPC ......................................................... 348/143
See application file for complete search history.

(56) References Cited

U.S. PATENT DOCUMENTS

| | | | | |
|---|---|---|---|---|
| 4,011,401 A | * | 3/1977 | Presti | 348/239 |
| 5,239,582 A | * | 8/1993 | Griesshaber | 380/215 |
| 7,624,416 B1 | * | 11/2009 | Vandermolen et al. | 725/109 |
| 7,671,893 B2 | * | 3/2010 | Li et al. | 348/211.3 |
| 2001/0033330 A1 | * | 10/2001 | Garoutte | 348/153 |
| 2004/0061780 A1 | * | 4/2004 | Huffman | 348/148 |
| 2004/0261127 A1 | * | 12/2004 | Freeman et al. | 725/135 |
| 2009/0015671 A1 | * | 1/2009 | Addy | 348/143 |
| 2009/0113505 A1 | * | 4/2009 | Yu | 725/114 |
| 2009/0141939 A1 | * | 6/2009 | Chambers et al. | 382/103 |
| 2009/0193475 A1 | * | 7/2009 | Halverson et al. | 725/87 |
| 2009/0257729 A1 | * | 10/2009 | Ahn | 386/46 |
| 2009/0304229 A1 | * | 12/2009 | Hampapur et al. | 382/103 |
| 2010/0157049 A1 | * | 6/2010 | Dvir et al. | 348/143 |
| 2010/0169786 A1 | * | 7/2010 | O'Brien et al. | 715/738 |
| 2010/0194859 A1 | * | 8/2010 | Heigl | 348/46 |
| 2010/0274820 A1 | * | 10/2010 | O'Brien et al. | 707/805 |
| 2011/0043691 A1 | * | 2/2011 | Guitteny et al. | 348/500 |

* cited by examiner

*Primary Examiner* — Hamza Algibhah
(74) *Attorney, Agent, or Firm* — Husch Blackwell LLP

(57) ABSTRACT

A system for and a method of creating a coherent video data stream of an object moving between a plurality of areas covered by a plurality of data collecting devices is provided. The method includes selecting a plurality of data collecting devices from the plurality of data collecting devices, synchronizing video data streams from the selected plurality of data collecting devices, substantially simultaneously reviewing the video data streams from the selected plurality of data collecting devices, specifying periods of interest for the video data streams from the selected plurality of data collecting devices, and sequentially combining portions of the video data streams into the coherent video data stream, the portions corresponding to the specified periods of interest.

13 Claims, 6 Drawing Sheets

PROCESS OF SEQUENTIALLY DUBBING A CAMERA FOR INVESTIGATION AND REVIEW

FIELD OF INVENTION

The present invention relates generally to video surveillance. More particularly, the present invention relates to systems and methods of creating coherent video data streams of an object moving between areas covered by multiple video data stream collecting devices.

BACKGROUND

Intelligent security has become a widespread and necessary reality of modern day civilization. One aspect of known intelligent security is video surveillance. Video surveillance is being increasingly used and accordingly, the number of cameras or other collection devices has also increased.

In known video surveillance systems, several cameras or other collection devices are often used to monitor a given location. For example, one video surveillance camera can be used to monitor an entry way to a particular building. Separate video surveillance cameras can be used to monitor each room in the building, and another video surveillance camera can be used to monitor the exit door of the building.

When a person, object, or group moves around the premises and from room to room of the building, it is difficult to create a single coherent video data stream of that person, object, or group. Traditionally, creating such a video data stream would require manually notating the different cameras capturing the person and then creating clips at different start and stop times from the various cameras. Then, a person would have to manually combine the various clips into a coherent video data stream. This is a time consuming, tedious, and convoluted process.

For example, in a forensics operation, often an evidentiary video data stream of a person, object, or group is desired to show the movement of that person, object, or group around a particular city, building, room, etc. As explained above, known solutions only provided for the manual creation of the evidentiary video data stream. The time, expense, man hours, and complexity associated with the manual creation of a coherent video data stream showing an object as it moves through a particular area has led many users to desire an automated or guided system and method for creating such a coherent data stream.

Accordingly, there is a continuing, ongoing need for an automated or interactive system and method for creating a coherent video stream showing an object as it moves through a particular area. Preferably, the coherent video data stream can be created from video data streams from more than one camera capturing the object as it moves between areas that are covered by the different cameras.

DESCRIPTION OF THE PREFERRED EMBODIMENTS

Figure 1A:
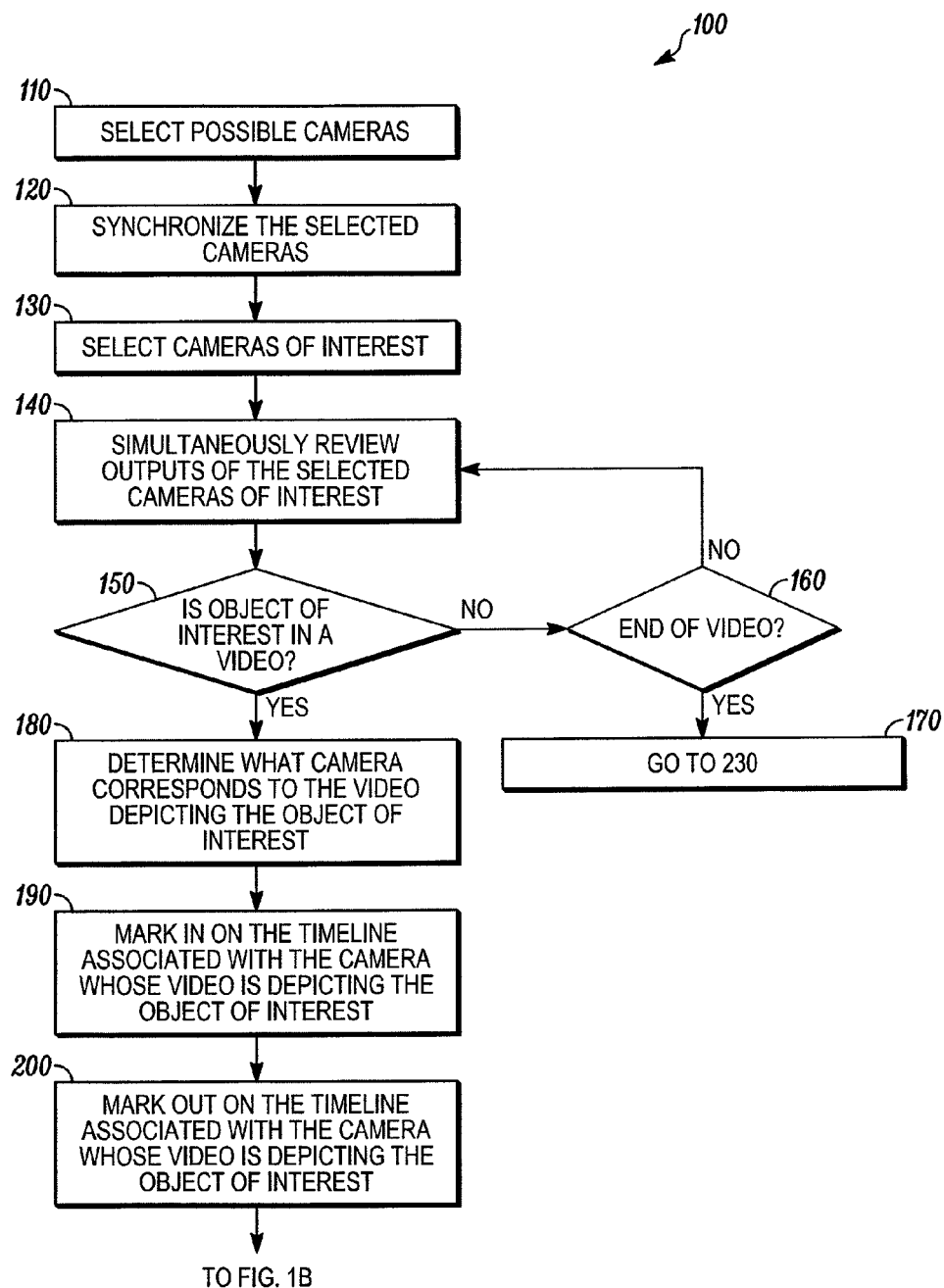
FIGS. 1A and 1B are flow diagrams of a method of creating a coherent video data stream in accordance with the present invention.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments of the present invention include automated or interactive systems and methods for creating coherent video data streams of an object as it moves through a particular area. Preferably, a coherent video data stream can be created from video data streams from more than one camera capturing the object as it moves between areas that are covered by the different cameras. Sources of the video data streams can be real-time live image sequences or pre-stored sequences without limitation.

In accordance with the systems and methods of the present invention, multiple cameras or other information collecting devices can be located in a particular area. Such an area can include a city, a building, a room, or the like all without limitation.

The cameras or other information collecting devices can be dispersed throughout the area so that each camera covers a different region within the area. For example, if the area is a city, each camera in the area can cover one block of the city. In this way, the entire city is captured by the cameras in the area. However, each individual camera only captures a portion of the area.

When a particular person, object, or group moves throughout the area, it will be captured by at least one of the cameras in the area at all times. However, each individual camera will only capture the person, object, or group when it is in the particular region covered by that camera.

Systems and methods in accordance with the present invention enable a user to simultaneously review video data streams from cameras in the area to create a coherent video data stream or clip sequentially showing the person, object, or group as it moves throughout the area. That is, the coherent video data stream can include data streams from each camera showing the person, object, or group in that region. The data streams from different sources can be chronologically ordered so that the complete and coherent video data stream shows the person, object, or group at all times and in a coherent, sequential manner as it moves throughout the area.

Systems and methods in accordance with the present invention can be automated or interactive. The present invention provides an easy-to-operate method to create and provide a coherent video data stream with minimal human error. Coherent video data streams in accordance with the present invention could be used in a variety of applications, including, for example, forensic operations, evidence production, and the like all without limitation.

Figure 1B:
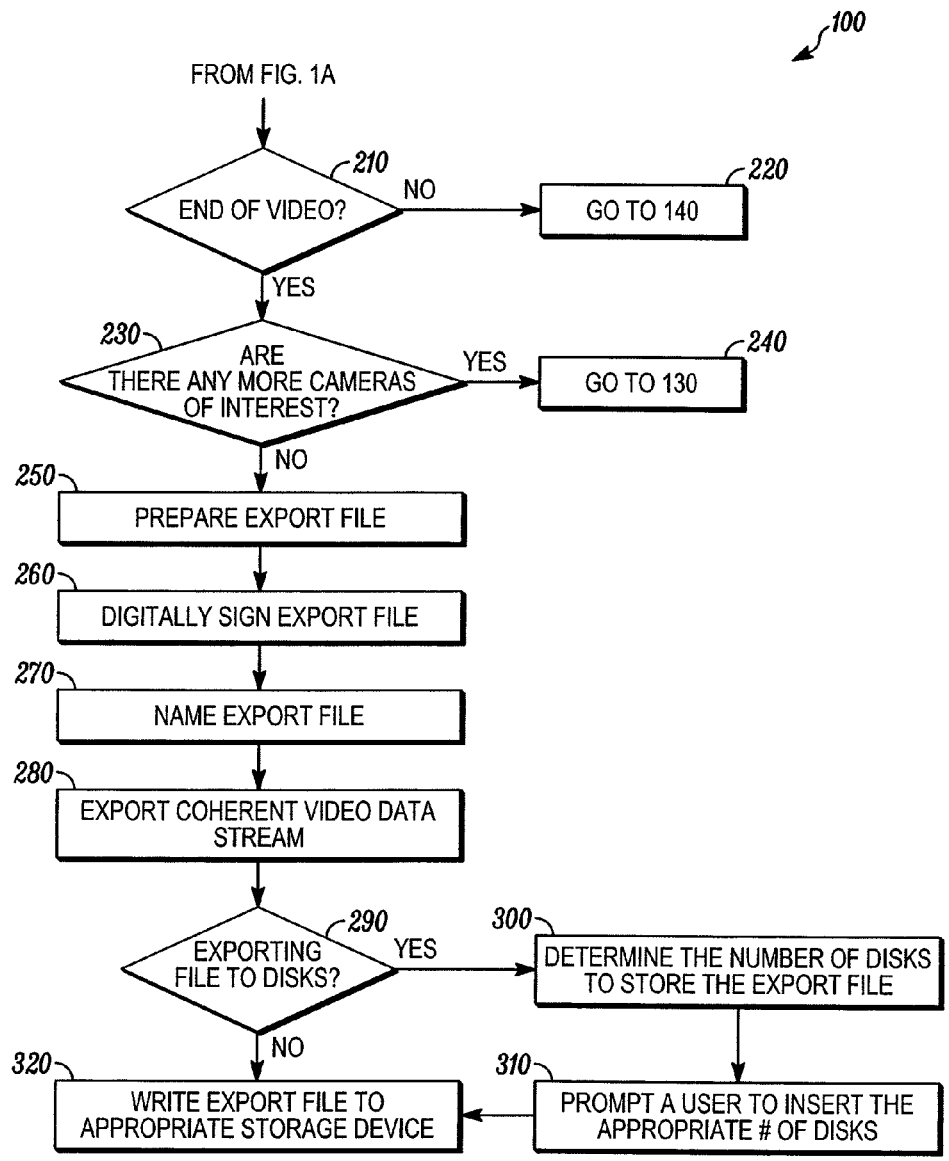

FIGS. 1A and 1B illustrate a flow diagram of an exemplary method 100 of creating a coherent video data stream in accordance with the present invention. In the method 100, a user can select the possible cameras or other data collection devices that it suspects might have captured the person, object, or group of interest as in 110. The selected cameras can monitor areas or regions in which the user believes the person, object, or group of interest might have travelled. For example, the user can select cameras that monitor a particular city, building, room or the like. Then, the method 100 can synchronize the selected cameras as in 120 so that the user can view data streams or image sequences from the selected cameras for the same period of time, such as, for example, the same hour, day, or week. The data streams can be analog or digital and can be pre-stored or real-time streaming video without limitation.

From the group of selected cameras, a user can select a certain number of cameras of interest as in 130. Video outputs from the selected cameras of interest can be viewed simultaneously on a viewing screen by the user as in 140. That is, the video data streams from each of the selected cameras can run concurrently, and the user can review the video data streams from the selected cameras at the same time. The number of cameras selected as cameras of interest at one time can be, for example, four, or any number that can be appropriately displayed on a viewing screen showing the video from the selected cameras.

As the user reviews the video data streams from the selected cameras of interest, the user can determine whether the object of interest is depicted in any of the video data streams from the selected cameras of interest as in 150. If the object of interest is not in any of the video data streams, then the method 100 can determine if the end of the video data stream has been reached as in 160. If the end has been reached, then the method can proceed to determine whether there are any more cameras of interest as in 230. However, if the end of the video has not been reached, a user can continue to review the vide data streams from the selected cameras of interest as in 140.

If the object of interest is depicted in any of the video data streams from the selected cameras of interest, then the user can mark the video data stream in which the object of interest is depicted. Alternatively, the user can mark a time line associated with the video data stream depicting the object of interest or a viewing screen displaying the video data stream.

When the object of interest is depicted in a video data stream, the method 100 can first determine to which camera the video data stream corresponds as in 180. For example, if the video data stream depicting the object of interest corresponds to a first camera in the group of selected cameras of interest, then the user can mark or identify the first video data stream, associated time line, or associated viewing screen with a selected symbol, for example, an IN marking, as in 190. The IN marking can correspond to the time when the object of interest is first depicted in the first video data stream (i.e. an entrance time). When the object of interest no longer appears in the first video data stream (i.e. an exit time), the user can mark the first video data stream, associated time line, or associated viewing screen with another selected symbol, such as an OUT marking, for example, as in 200. Similarly, if the video data stream depicting the object of interest corresponds to a second camera in the group of selected cameras of interest, then the user can appropriately mark the second video data stream, associated time line, or associated viewing screen.

After a video data stream, associated time line, or associated viewing screen has been marked at the time when the object of interest begins to be depicted (i.e. the entrance time) and at the time when the object of interest is no longer depicted (i.e. the exit time), then the method 100 can determine if the end of the video has been reached as in 210. If the end of the video has not been reached, then a user can continue to review video data streams from the selected cameras of interest as in 140.

However, if the method 100 determines that the end of the video has been reached for the selected group of cameras, then the method 100 can determine whether there are any more cameras of interest as in 230. If there are more cameras of interest, then the method 100 can proceed to select more cameras of interest as in 130. However, if there are no more cameras of interest, then the method 100 can prepare a coherent video data stream to be exported as in 250.

The coherent vide data stream that is prepared by the method 100 can include the data stream clips corresponding to the selected periods of interest from each of the digital video streams. The periods of interest can relate to the portions of the video data streams between the entrance and exit times. That is, the periods of interest can cover times when the object of interest is depicted in a particular data stream. The data stream clips of the selected periods of interest can be arranged so that the coherent video data stream is chronological. That is, the coherent video data stream can be synchronized by time. In embodiments of the present invention, the original camera names or numbers, the user marking the periods of interest, and the names of the export files, for example, can be automatically traced and tracked so that the exported coherent video data stream includes this information as embedded data, for example.

The user can digitally sign a file to be exported as in 220 and name the file to be exported as in 230. Then, the method 100 can export the file containing the coherent video data stream as in 240 to a drive, disk, or other storage device, for example, a hard disk drive, Blu-ray disk, digital video disc (DVD), or compact disc (CD). If the method 100 determines that it is exporting the file to a disk, for example, as in 290, then the method 100 can determine the number of disks required to appropriately store the entire file as in 300 and prompt a user to insert that many disks as in 310. Finally, the method 100 can write the export file containing the coherent video data stream to the selected storage device.

As described above, when an object of interest is depicted on a video data stream from a camera, a user can mark that video data stream, associated time line, or associated viewing screen at entrance and exit times. In embodiments of the claimed invention, when a user marks a video data stream, associated time line, or associated viewing screen with IN at an entrance time, the user will be given the option to mark the video data stream, associated time line, or associated viewing screen from the last time any video data stream, associated time line, or associated viewing screen in the selected group was marked OUT. That is, a user will be given an option to mark IN from the previous mark OUT. In such embodiments, the coherent video data stream that is created from the selected periods of interest will include video for all relevant time and will not include more than one video data stream for any particular time. That is, the coherent video data stream will not omit or duplicate any relevant periods of time.

In further embodiments, the method 100 can provide a default overlap period that can be, for example, 30 seconds. A user can change the overlap period to be greater or less than the default overlap period.

Figure 2:
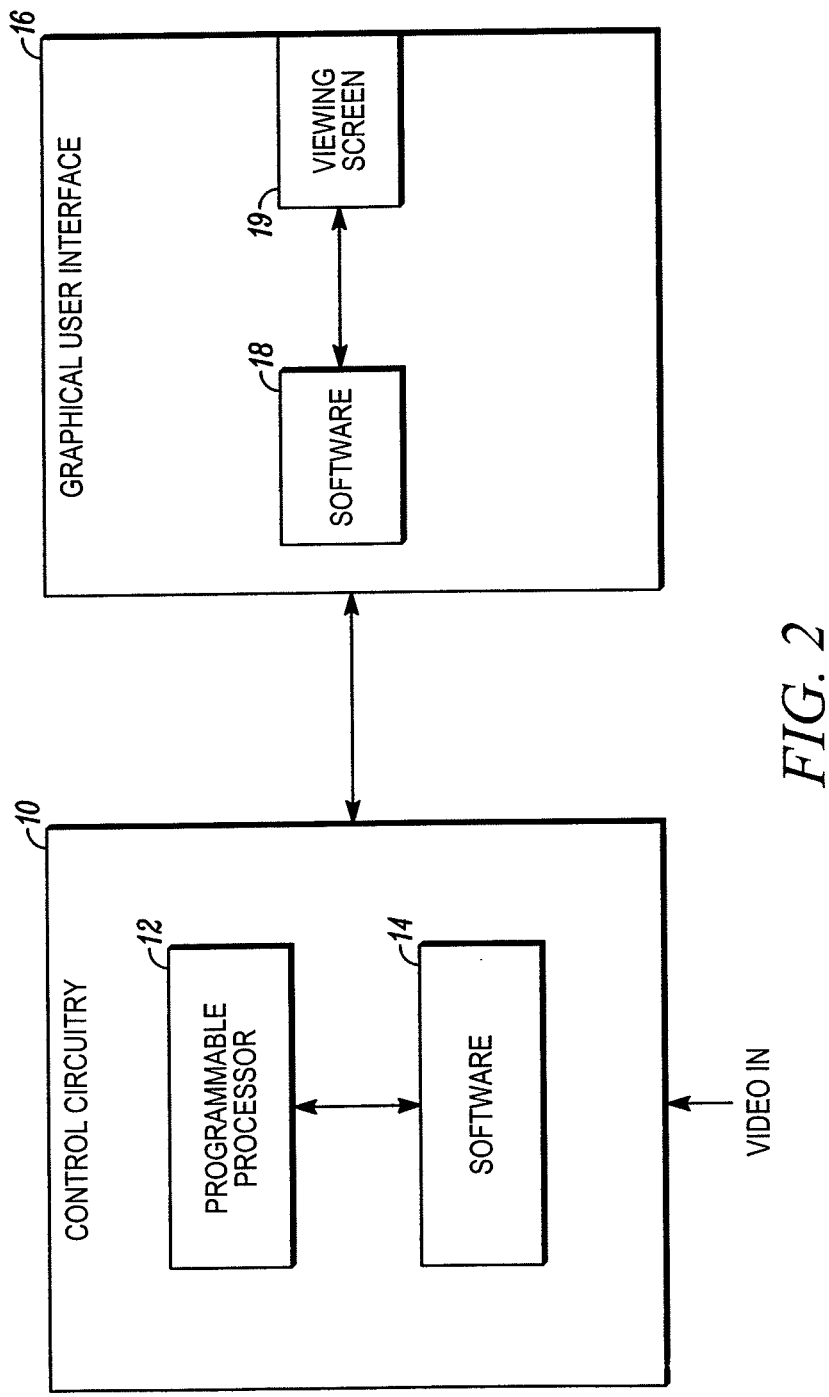
FIG. 2 is a block diagram of a system for carrying out the method of FIGS. 1A and 1B in accordance with the present invention.

The method shown in FIGS. 1A and 1B and others in accordance with the present invention can be implemented with a programmable processor and associated control circuitry. As seen in FIG. 2, control circuitry 10 can include a programmable processor 12 and associated software 14 as would be understood by those of ordinary skill in the art. Video data streams from a plurality of cameras or other data collection or storage devices can be input into the programmable processor 12 and associated control circuitry 10. An associated user interface 16 can be in communication with the processor 12 and associated circuitry 10. A viewing screen 19 of the user interface 16, as would be known by those of skill in the art, can display an interactive window. In embodiments of the present invention, the user interface 16 can be a multidimensional graphical user interface.

Figure 3:
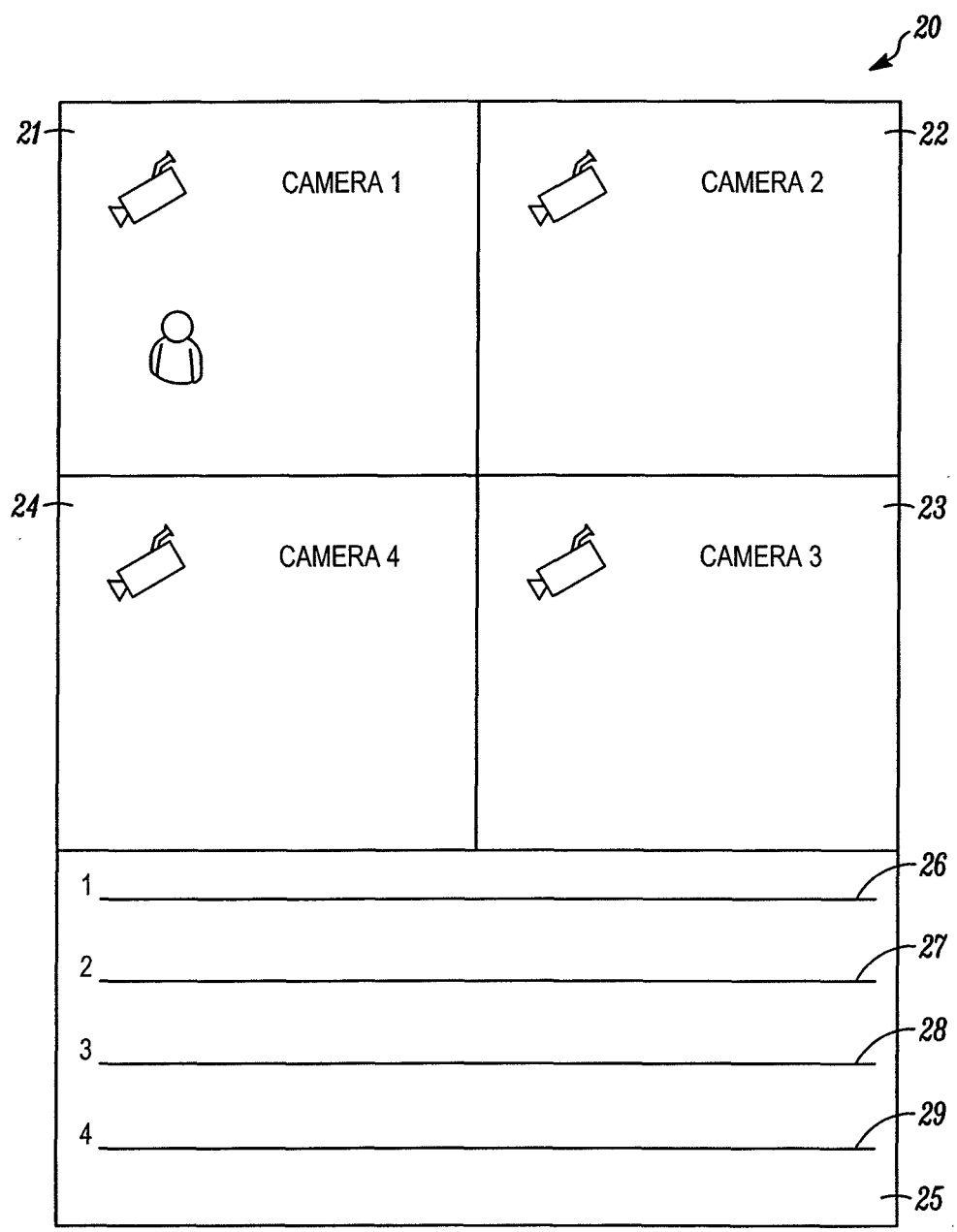
FIG. 3 is an interactive window displayed on a viewing screen of a graphical user interface for creating a coherent video data stream of an object as it moves through a particular area in accordance with the present invention.
Figure 4:
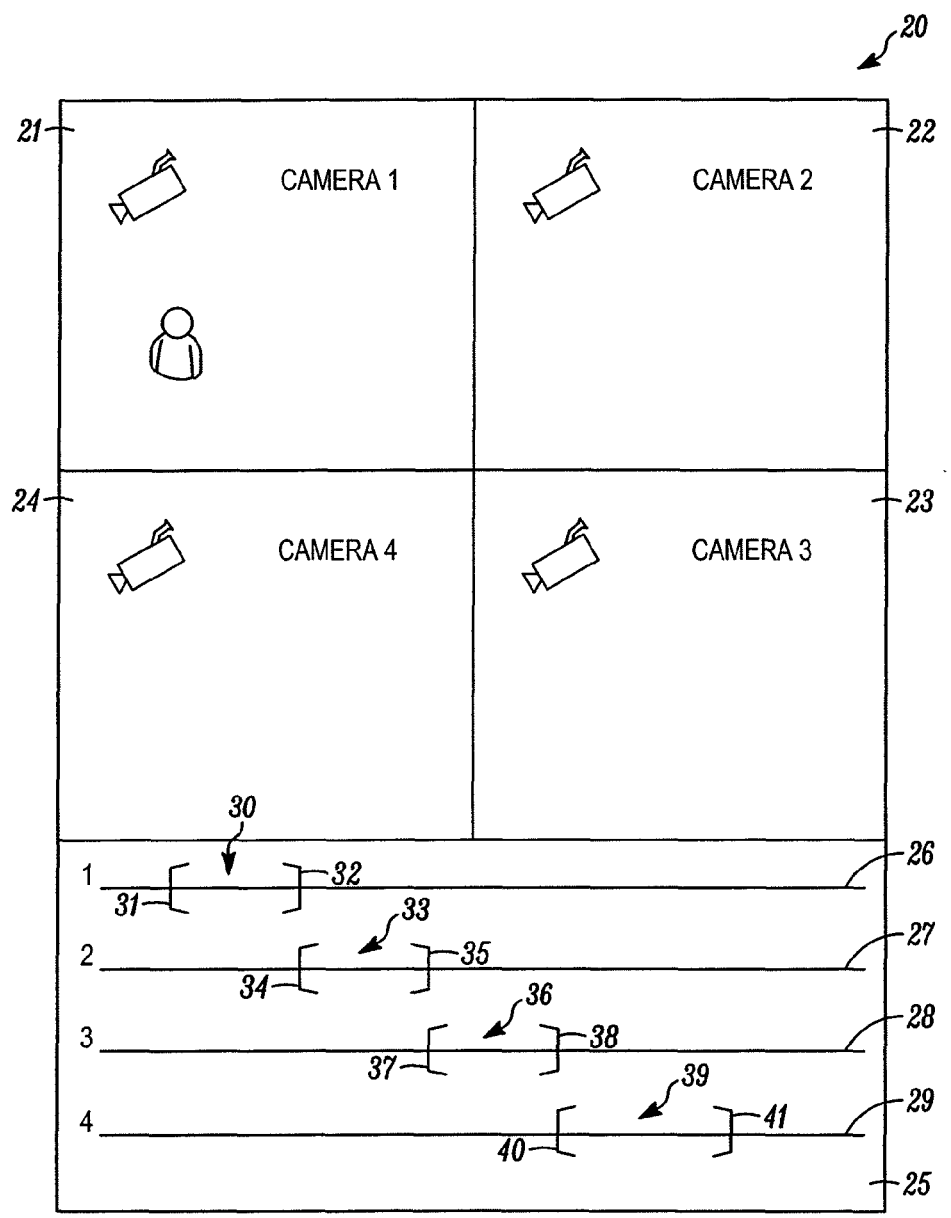
FIG. 4 is an interactive window displayed on a viewing screen of a graphical user interface for creating a coherent video data stream of an object as it moves through a particular area and for marking time lines associated with video data streams in accordance with the present invention.
Figure 5:
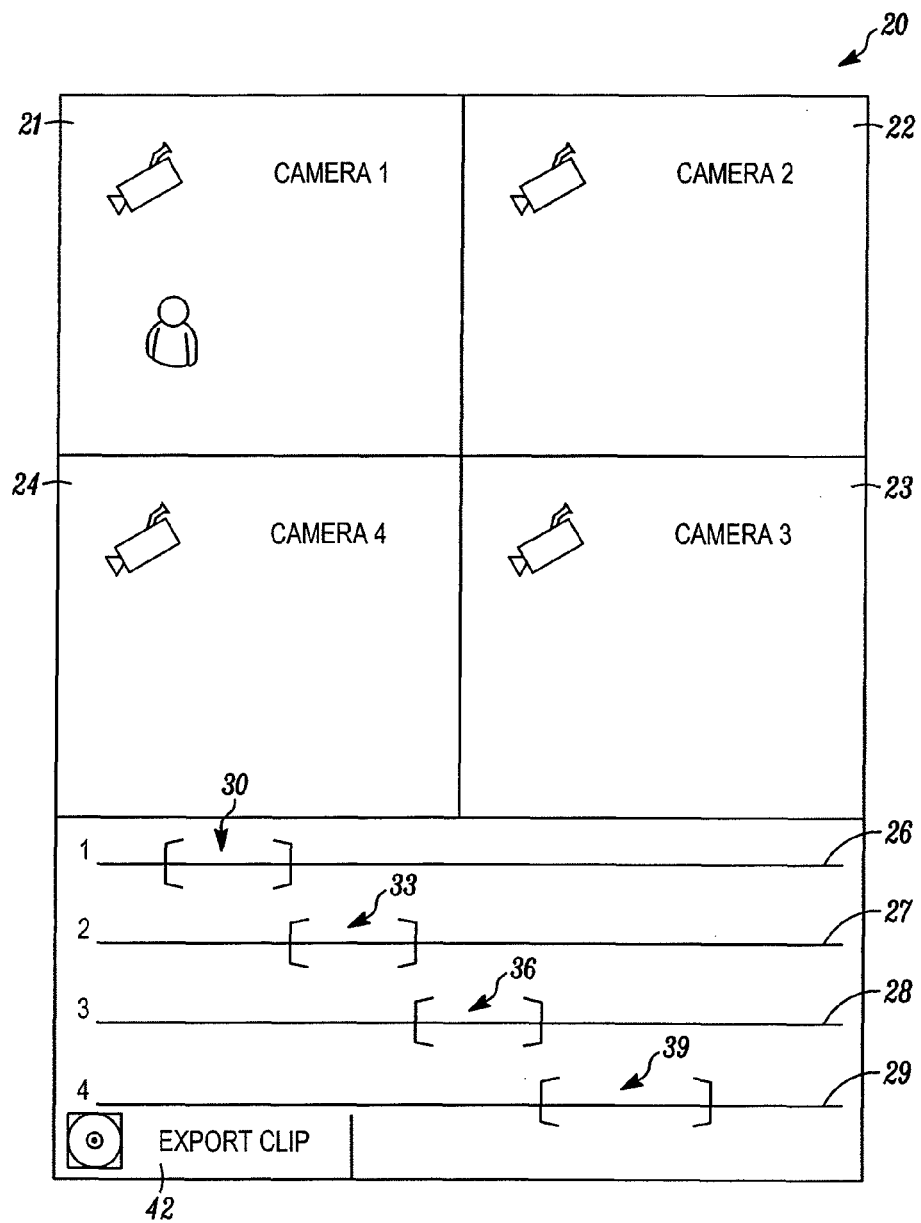
FIG. 5 is an interactive window displayed on a viewing screen of a graphical user interface for creating a coherent video data stream of an object as it moves through a particular area and for exporting the coherent video data stream in accordance with the present invention.

FIGS. 3-5 are block diagrams of exemplary interactive windows 20 displayed on a viewing screen 19 of a graphical user interface 16 for creating a coherent video data stream of an object as it moves through a particular area. Those of skill in the art will understand that the features of the interactive windows 20 in FIGS. 3-5 may be displayed by additional or alternate windows. Alternatively, the features of the interactive windows 20 of FIGS. 3-5 can be displayed on a console interface without graphics.

Using the exemplary interactive windows of FIGS. 3-5, a user can review video data streams from a plurality of selected cameras and mark portions of each of the video data streams, associated time lines, or associated viewing screens. For example, as seen in FIG. 3, a user can select a plurality of cameras, cameras 1-4, for review. Each of the cameras can capture a different area, and the user can review the video data streams from each camera for the presence of an object of interest.

Once the cameras are synchronized, the video data streams from each of the cameras can be displayed in different viewing panes, for example, 21, 22, 23, and 24, of the window 20. A user can simultaneously view each of the video data streams and mark or identify a particular data stream, associated time line, or associated viewing screen when a person, object, or group of interest appears on that data stream.

For example, when a user observes a person of interest depicted on a viewing pane associated with a particular video data stream, the user can externally trigger the viewing pane to display a menu. For example, the user could click or press the viewing pane using a mouse or other controller, or the user could click or press an appropriate key on an associated keyboard. The user could then select an IN marking at the time when the person of interest is first depicted on the viewing pane. Similarly, when the person of interest no longer is depicted on the associated viewing screen, the user can externally trigger the viewing pane to display a menu, and the user can select an OUT marking. In such embodiments, the IN and OUT markings can be associated with frame times from the camera corresponding to the particular data stream displayed in the selected viewing pane.

The window 20 can also include a time line viewing pane 25, which can include time lines, 26, 27, 28, and 29 for each of the cameras displaying video in the viewing panes 21, 22, 23, and 24, respectively. When a user observes the person of interest, for example, in a video data stream, the user can mark the corresponding time line with an IN marking at the time when the person of interest is first depicted in the data stream. When the person of interest no longer is depicted in the video data stream, the user can mark the corresponding time line with an OUT marking. That is, the user can mark the appropriate time line with IN and OUT markings at the exact entrance and exit times of the person of interest in a corresponding video data stream.

As seen in FIG. 4, each time line 26, 27, 28, and 29, can be marked with a selected period of interest, 30, 33, 36, and 39, respectively. It is to be understood that any time line can be marked with more than one period of interest if, for example, the object of interest is depicted on the video corresponding to that time line more than once. Further, it is to be understood that the selected periods of interest can be of varying lengths of time. The length of time for any selected period of interest corresponds to the length of time that the object of interest is depicted on of the corresponding video data stream.

In FIG. 4, each time line 26, 27, 28, and 29 has been marked IN at times represented at 31, 34, 37, and 40, respectively. Each time line has also been marked OUT at times represented as 32, 35, 38, and 41, respectively. The selected periods of interest 30, 33, 36, and 39 correspond to the span between each IN marking 31, 34, 37, and 40, respectively, and each OUT marking 32, 35, 38, and 41, respectively.

As explained above, in embodiments of the claimed invention, when a user marks a video data stream, associated time line, or associated viewing screen with an IN marking, the user will be given the option to mark the video data stream, associated time line, or associated viewing screen from the last time any video data stream, associated time line, or associated viewing screen in the selected group was marked OUT. That is, a user will be given an option to mark IN from the previous mark OUT. As can be seen in FIG. 4, in such embodiments, no selected period of time will overlap with any other selected period of time for selected cameras of interest.

Referring now to FIG. 5, when the end of the video from the selected cameras of interest has been reached, and no additional cameras of interest are selected, a user can begin the preparation of an export file by clicking on or pressing an Export Clip button 42. The coherent video data stream created by systems and methods of the present invention can be loaded in the export file, and the export file can be written to an appropriate storage device.

Software 14, which can implement the exemplary method of FIGS. 1A and 1B, can be stored on a computer readable medium, for example, a disk or solid state memory, and can be executed by the processor 12. The disk and associated software can be removably coupled to the processor 12. Alternatively, the software 14 can be downloaded to the medium via a computer network.

From the foregoing, it will be observed that numerous variations and modifications may be effected without departing from the spirit and scope of the invention. It is to be understood that no limitation with respect to the specific system or method illustrated herein is intended or should be inferred. It is, of course, intended to cover by the appended claims all such modifications as fall within the spirit and scope of the claims.

What is claimed is:

1. A method of creating a coherent video data stream of an object moving between a plurality of areas covered by a plurality of data collecting devices comprising:

receiving user input to select a plurality of data collecting devices from the plurality of data collecting devices;

synchronizing playback of video data streams from the selected plurality of data collecting devices;

displaying the video data streams from the selected plurality of data collecting devices substantially simultaneously;

receiving user input to specify time periods of in each of the video data streams from the selected plurality of data collecting devices, the user input including entrance times and exit times corresponding to times when the object appears and ceases to appear, respectively, in a respective video data stream;

receiving user input to move each entrance time identified by the user input to a time substantially immediately after a last marked exit time; and sequentially, according to time, combining portions of the video data streams into the coherent video data stream, the portions corresponding to the specified time periods of interest.

2. The method of claim 1 wherein the plurality of data collecting devices comprise cameras.

3. The method of claim 1 further comprising receiving user input to specify time periods of interest on a display of the video data streams.

4. The method of claim 1 further comprising storing the coherent video data stream in a selected file.

5. The method of claim 4 wherein the selected file is stored in at least one of a hard disk drive, a digital video disc, a compact disc, or a Blu-ray disk.

6. An interactive viewing apparatus comprising:
   circuitry for displaying a plurality of video data streams from a plurality of cameras;
   circuitry for synchronizing playback of the plurality of video data streams;
   circuitry for receiving user input to specify time periods of interest in each of the plurality of video data streams, the user input including entrance times and exit times corresponding to times when an object appears and ceases to appear, respectively in a respective video data stream;
   circuitry for receiving user input to move each entrance time identified by the user input to a time substantially immediately after a last marked exit time; and
   circuitry for creating and exporting a file containing a coherent video data stream containing the identified time periods of interest.

7. The interactive viewing apparatus of claim 6 which includes a graphical user interface associated with at least one of control circuitry or a programmable processor.

8. The interactive viewing apparatus of claim 7 wherein the control circuitry or the programmable processor creates the file containing the coherent video data stream.

9. The interactive viewing apparatus of claim 7 wherein the control circuitry or the programmable processor creates the coherent video data stream.

10. The interactive viewing apparatus of claim 9 wherein the control circuitry or the programmable processor sequentially combines segments of the plurality of video data streams corresponding to marked times to create the coherent video data stream.

11. A system for creating a coherent video data stream of an object moving between a plurality of areas covered by a plurality of data collecting devices comprising:
    a programmable processor and associated control circuitry; and
    a user interface coupled to the programmable processor,
    wherein the user interface displays a plurality of video data streams from a selected plurality of data collecting devices,
    and
    wherein the programmable processor and the associated control circuitry synchronize playback of the plurality of video data streams, receive user input to specify time periods of interest in each of the plurality of video data streams, the user input including entrance times and exit times corresponding to times when the object appears and ceases to appear, respectively, in a respective video data stream, receive user input to move each entrance time identified by the user input to a time substantially immediately after a last marked exit time, and sequentially, according to time, combine portions of the video data streams into the coherent video data stream, the portions of the video data streams corresponding to the specified time periods of interest.

12. The system of claim 11 further comprising a storage device for storing an export file containing the coherent video data stream, the storage device is at least one of a hard disk drive, a digital video disc, a compact disc, or a Blu-ray disk.

13. The method of claim 1 further comprising receiving user input to specify time periods of interest on a display of a timeline associated with the video data streams.

* * * * *